United States Patent Office 3,532,958
Patented Oct. 6, 1970

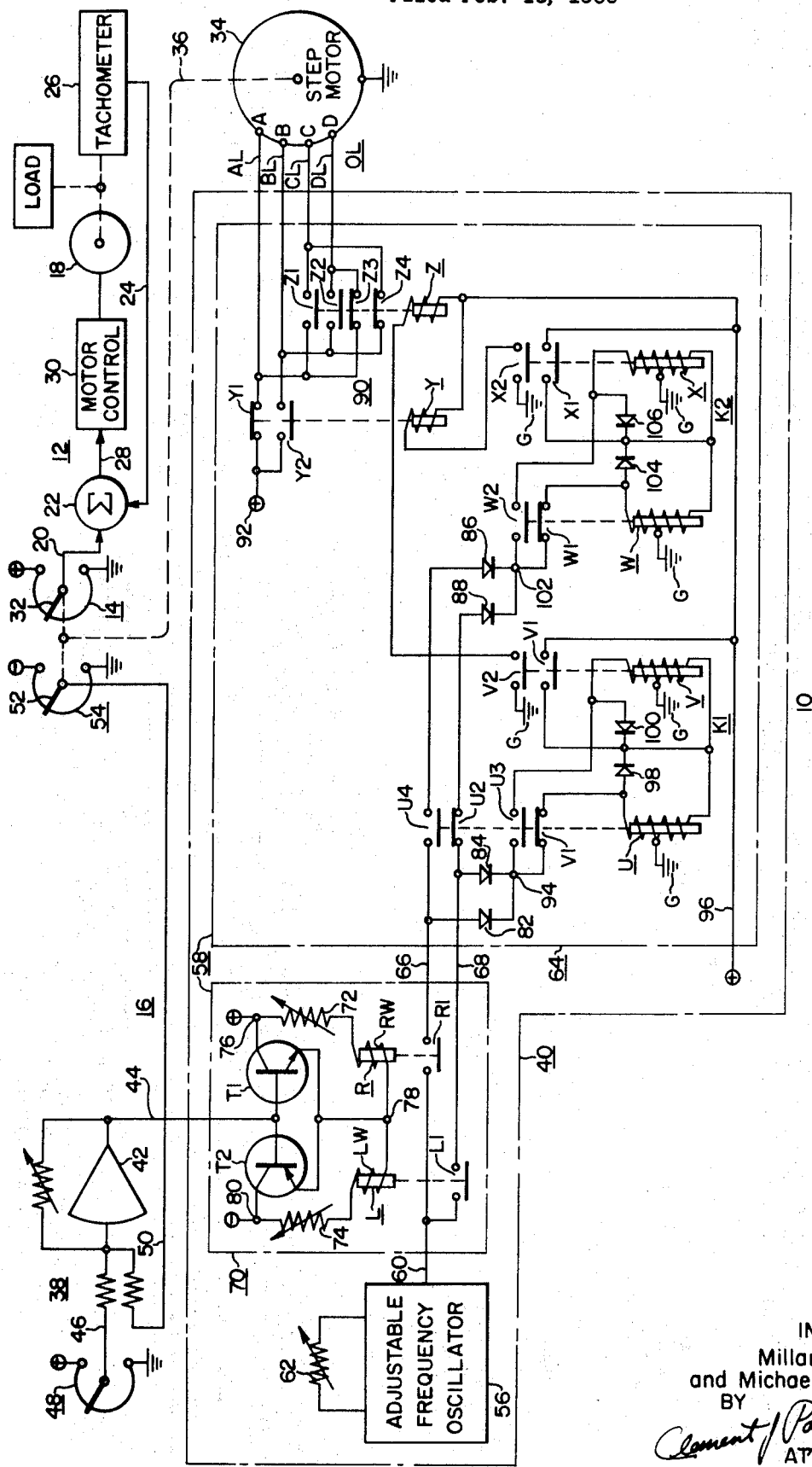

3,532,958
CLOSED LOOP POSITION CONTROL SYSTEM EMPLOYING A STEP-MOTOR
Millard F. Smith, Philadelphia, and Michael C. Luongo, Brookhaven, Pa., assignors to Westinghouse Electric Corporation, Pittsburgh, Pa., a corporation of Pennsylvania
Filed Feb. 18, 1966, Ser. No. 528,640
Int. Cl. G05b 6/02
U.S. Cl. 318—685       12 Claims

ABSTRACT OF THE DISCLOSURE

There is described a remotely controllable closed loop positioning system for setting the reference (desired condition) in a closed loop condition regulating system. A stepping motor drives a reference potentiometer at a constant rate or at a variable controlled rate by means of a control system which in response to position error signal translates periodic pulses into either a forward or a reverse stepping program for the stepping motor input, depending on the direction of position error. The specific condition regulating system shown by way of example is a speed regulating system.

---

This invention relates to a remotely controlled reference setting system for adjusting as desired the reference in a condition regulating closed loop system. The reference setting system includes a unique position control system which while especially suited for remote reference adjustment, also has independent utility as a position control system.

In some previously proposed systems for remotely setting a reference potentiometer in a condition regulating servo loop, the potentiometer arm is driven by a motor, and the rate at which the potentiometer setting is changed is kept constant by a speed regulating loop which regulates the speed of the potentiometer drive motor. Systems of this type are subject to such disadvantages as high cost and relatively narrow range of speeds at which the potentiometer motor can be driven.

It is therefore an object of the present invention to provide a novel reference setting system wherein an adjustable reference is driven at a constant rate or a variable controlled rate in a novel manner.

Another object is to provide such a system wherein the adjustable reference is driven at a selectable constant rate over a wide range of speeds.

Another object is to provide a remote position control wherein the position of a movable member is changed at a constant rate or a variable controlled rate in a novel manner.

It is a further object of the invention to provide such a position control system wherein the movable member is moved at a selectable constant rate over a wide range of speeds.

A still further object is to provide positioning and reference setting systems having relatively simple design and low cost.

The above advantages may be realized in accordance with one embodiment of the invention wherein a mechanically adjustable electrical reference source is step-driven by a step motor at a constant rate through translation of periodic pulses from a pulse generator into one or the other of two different signal arrangements depending on the direction of difference between desired and actual positions of the reference source, one of the signal arrangements stepping the motor in one direction, the other signal arrangement stepping the motor in the opposite direction.

Other and further objects will be apparent from the following detailed description taken in connection with the single figure drawing wherein a diagram illustrates a preferred embodiment of the invention.

Referring now to the drawing, a condition control system 10 includes a condition regulating closed loop system 12 with an adjustable reference source 14 remotely settable by a closed loop position control system 16. A "closed loop system" as referred to herein is a system wherein a feedback signal representing actual condition is compared to a reference signal representing desired condition to produce a control signal that is employed to control the output condition in a manner to reduce the difference between actual and desired conditions. The output condition controlled by closed loop system 16 is position, while the output condition controlled by closed loop system 12 is, for example, speed.

By way of example, the condition regulating system 12 is shown as a speed regulating system for regulating the speed of a motor 18 at a desired or command speed represented by the reference signal supplied by the reference source 14 along a line 20 to one input of an error generator 22 shown as a summing circuit. Another input to the summing circuit is supplied along a line 24 with a negative feedback signal proportional to the actual speed of motor 18. The feedback signal on line 24 is supplied by a tachometer generator 26 driven by motor 18.

The comparator 22 provides on an output line 28, an error signal which is proportional to the difference between the desired and actual speeds of motor 18. In response to the error signal on line 28, a motor control circuit 30 energizes and controls the motor 18 in a manner to reduce the error or difference between desired and actual speeds, thus to maintain the motor at the desired or commanded speed. While reference source 14 may be any suitable adjustable source, it is shown as a DC (direct current) energized potentiometer connected to a suitable potential source not shown. An adjustable contact arm 32 of this potentiometer is connected to line 20 to supply thereto a signal proportional to the position of the arm 32.

Setting or positioning of arm 32 as desired is effected by operation of a reversible stepping motor 34 whose output shaft 36 is coupled in driving relation to arm 32. Stepping motor 34 is any suitable motor whose output shaft may be selectively driven in discrete steps in one or the opposite direction in response respectively to one or the other of two different input signal arrangements applied to the motor input circuit. Output shaft 36 and elements driven thereby may be considered to be the mechanical output of the positioning system 16, which in addition to the stepping motor 34 includes a position error generator 38 and a control system 40 that responds to the output of the error generator 38 to apply to the motor input circuit 34 one or the other of the aforementioned signal arrangements depending on the direction of error between actual and desired positions of the output shaft 36 and potentiometer arm 32.

Although any suitable error generating system may be employed, the one shown by way of example at 38 includes a summing operational amplifier 42 that algebraically sums input signals applied thereto and provides on an output line 44 a signal having a polarity dependent on the polarity of the algebraic sum of the input singals to the amplifier. A signal representing desired or command position of the shaft 36 and potentiometer arm 32 is supplied to one of the summing inputs of amplifier 42 along a line 46 from a suitable source 48 of position command signals shown by way of example as a potentiometer connected to a suitable DC source not shown.

A negative feedback signal proportional to the actual position of shaft 36 is supplied through a line 50 to another summing input of amplifier 42. The negative feedback signal on line 50 is obtained by way of example from the contact arm 52 of a potentiometer 54 suitably energized from a DC source not shown. Contact arm 52 is coupled to the motor output shaft 36 to be driven thereby so that the position of this contact arm is dependent on the position of shaft 36 and is representative of the position of contact arm 32. The voltage on arm 52 and line 50 is dependent on the position of the arm 52 and thus is proportional to the actual position of shaft 36 and contact arm 32.

As hereinbefore indicated amplifier 42 is of the push-pull or bi-directional output type. Usually operational amplifiers are signal inverters so that if the algebraic summation of input signals is positive the output on line 44 is negative and vice versa. From the aforesaid explanation of the error generator 38, it is seen that there will be provided on line 34 a positive signal when contact arm 32 is on one side of the desired position, and a negative signal when the contact arm 32 is on the opposite side of the desired position. Thus, the polarity of the signal on line 44 depends upon the direction of the position error. If the motion of the potentiometer arm 32 is rectilinear, position error may be up or down from a desired position, or to the left or right from a desired position, etc. On the other hand if the motion of potentiometer arm 32 is rotated about an axis, position error may be referred to as clockwise or counterclockwise of a desired position, or plus and minus angles from a desired position, etc.

By way of example and for convenience of explanation, potentiometers 14, 48 and 54, and motor 34 are shown as rotary types, and it is assumed that clockwise movement of shaft 36 moves potentiometer arms 32 and 52 clockwise, and vice versa. It is also assumed that clockwise movement of arm 32 raises the command speed of the speed regulating system 12, and that clockwise movement of the potentiometer 48 arm will effect clockwise positioning of output shaft 36 through the positioning system 16. The condition where actual position is clockwise of the command position shall be referred to as "clockwise error," requiring counterclockwise correction to reduce the error. On the other hand, "counterclockwise error" shall refer to the situation where actual position is counterclockwise of the command position, thus requiring clockwise correction to reduce the error. It is further assumed that a negative signal on line 44 represents counter-clockwise error requiring clockwise correction.

Control circuit 40 includes a source of periodic pulses 56 and a control circuit 58 for translating periodic pulses received on a line 60 into one or the other of the aforesaid motor driving signal arrangements depending on the polarity of the error signal on line 44, the translation occurring at a fixed ratio of said pulses to steps or increments of motor movement. The rate of position change depends upon the repetition rate of the pulses supplied along line 60, and therefore the rate or frequency range of the oscillator 56 is chosen in accordance with the range of the desired rates of change. Pulse generator 56 may for example be a free-running oscillator whose frequency is adjustable with a control symbolized at 62 and which may be a manually variable resistor in an RC circuit whose time constant determines the output frequency of the oscillator. In the illustrated example, oscillator 56 is shown as providing positive pulses on line 60.

Control system 58 includes a translating (converting) circuit 64 for converting periodic pulses received on one or the other of two input lines 66 and 68 into one or the other respectively of the aforementioned motor driving signal arrangements on the output lines (collectively indicated at OL) of controller 40, depending on the polarity of the signal on line 44. In the example shown, OL includes output lines AL, BL, CL and DL. Controller 58 further includes a circuit 70 for selectively gating or steering pulses arriving on line 60 to (selectively steering) either line 66 or line 68 depending on the polarity of the signal on line 44.

The selecting circuit 70 includes a pair of relays R and L having respective operating windings RW and LW connected in series with a pair of variable resistors 72 and 74 across a DC source. More specifically, resistor 72 and winding AW are connected between a pair of junctions 76 and 78 while resistor 74 and winding BW are connected between junction 78 and a junction 80. Relay R is provided with a set of normally open contacts R1, which when closed, connect line 60 to line 66. Contacts R1 close when winding RW is energized (relay R picked up). Relay L is provided with a pair of normally open contacts L1 which when closed, connect line 60 to line 68. Contacts L1 are closed when winding LW is energized (relay L picked up). Picked up and released modes of relays may for convenience be referred to as ON and OFF states.

The main current path (collector-emitter) of a transistor T1 is connected across junctions 76 and 78. The main current path (emitter-collector) of another transistor T2 is connected across junctions 78 and 80. Transistors T1 and T2 are of opposite conductivity type, T1 being shown as an n-p-n, and T2 as a p-n-p type. The bases of transistors T1 and T2 are connected to the output line 44 of the error generator 38.

When the signal polarity on line 44 is positive, transistor T1 will be turned ON to effect a low impedance shunt across resistor 72 and winding RW thereby applying the supply voltage across junctions 78 and 80 to pick up the relay L and close contacts L1. On the other hand if the output signal on line 44 is of negative polarity, transistor T2 will be turned on thereby "shorting" winding LW and applying substantially full supply voltage to winding RW, thus to pick up relay R and close contacts R1. Resistors 72 and 74 may be adjusted to determine at what error voltage level relays A and B will pick up or respond to. It is obvious from the above that the pulses on line 60 are steered to one or the other of input lines 66 and 68 depending on the polarity of the error signal on line 44.

Stepping motor 34 may for example be of a type wherein the input signal arrangement for stepping the motor in one direction is a succession in a particular sequence of a plurality of different signal patterns, and for stepping the motor in the opposite direction is a succession in the reverse sequence of that plurality of different signal patterns, the output shaft of the motor moving one step in response to each of the signal patterns. The specific stepping motor example shown at 34 is of a type having four input terminals (indicated at A, B, C and D), and is stepped in one direction by successively energizing in a particular order or sequence four different combinations of two terminals at a time, and is stepped in the opposite direction by successively energizing in the reverse order the four different combinations, the motor moving one step per combination. The four input terminals of the stepping motor, indicated at A, B, C, and D, are connected to the output lines AL, BL, CL and DL, respectively. In the particular example shown the order of energization of the different terminal pairs for stepping the motor in one direction (for example clockwise) is A and C, B and C, B and D, A and D, A and C, etc. This order is reversed to step the motor in the opposite (counterclockwise) direction. Thus to step the motor counterclockwise, the sequence of energizing the different terminal pairs is A and C, A and D, B and D, B and C, A and C, etc. An example of a step motor of this type is described in U.S. Pat. No. 3,117,268.

Each of the above-mentioned energizing patterns for motor 34 involves a different combination of two energized and two unenergized motor terminals, and may for convenience be represented by Boolean notation of the form wherein a dot signifies "and" and a bar over a letter or term signifies "not." Thus for the illustrated example, the sequence of patterns for clockwise rotation in Boolean notation is: $A \cdot \bar{B} \cdot C \cdot \bar{D}$; $\bar{A} \cdot B \cdot C \cdot \bar{D}$; $\bar{A} \cdot B \cdot \bar{C} \cdot D$; $A \cdot \bar{B} \cdot \bar{C} \cdot D$; $A \cdot \bar{B} \cdot C \cdot \bar{D}$; etc. The reverse order of the same patterns for counterclockwise rotation is: $A \cdot \overline{B} \cdot C \cdot \overline{D}$; $A \cdot \overline{B} \cdot \overline{C} \cdot D$; $\overline{A} \cdot B \cdot \overline{C} \cdot D$; $\overline{A} \cdot B \cdot C \cdot \overline{D}$; $A \cdot \overline{B} \cdot C \cdot \overline{D}$; etc. The motor moves one step per pattern.

The production in the proper sequential order of the above-mentioned signal patterns each involving a different combination of two energized and two unenergized terminals, is effected by the converter 64 which translates periodic input pulses into the successive patterns which are transmitted to the motor through output lines AL, BL, CL and DL.

Converter 64, in the specific example, is a switching logic system including diodes 82, 84, 86 and 88, logic modules K1 and K2, and relays Y and Z. Relay Y is provided with normally closed contacts Y1 and normally open contacts Y2. Relay Z is provided with normally open contacts Z1 and Z2, and normally closed contacts Z3 and Z4. The contacts of relays Y and Z are arranged in a network 90 between one terminal 90 of a DC supply (not shown) and the output lines AL, BL, CL and DL leading to the motor 34. The arrangement of relays Y and Z is such that when both relays are released (OFF), only terminals A and D are energized (pattern $\overline{A} \cdot B \cdot C \cdot \overline{D}$); when only relay Z is picked up (ON), motor terminals A and C are energized (pattern $A \cdot \overline{B} \cdot C \cdot \overline{D}$); when only relay Y is picked up (ON), motor terminals B and C are energized (pattern $\overline{A} \cdot B \cdot C \cdot \overline{D}$); when both relays Y and Z are picked up, motor terminals B and D are energized (pattern $\overline{A} \cdot B \cdot \overline{C} \cdot D$). By means hereinafter described, relay Z switches states (alternates between ON on OFF states) in response to every input pulse on line 60. In the program of stepping the motor 34 in one direction, relay Y switches states in response to every odd numbered pulse on line 60. Relay Y switches states in response to every even numbered pulse on line 60 in the course of stepping the motor in the opposite direction.

Logic module K1 includes a pair of similar relays U and V. Logic module K2 is likewise provided with similar relays W and X. Each of the relays U, V, W and X is provided with a pair of opposed windings so arranged that the relay is operated ON (picked up) when only one of its windings is energized, and operated OFF (dropped out) when both windings are concurrently energized or concurrently unenergized. Relay U is provided with normally closed contacts U1 and U2, and normally open contacts U3 and U4. Relay V is provided with normally open contacts V1 and V2. Junctions between the windings of relay U and between windings of relay V are connected to a point G which is negative relative to the pulses on line 60. Diode 82 is connected between line 66 and a junction 94, and diode 84 is connected between line 68 and the junction 94. Contacts U1 are in a circuit between junction 94 and the upper winding of relay U. Similarly, contacts U3 are in a circuit between junction 94 and the upper winding of relay V. Contacts V1 are connected in a circuit between a positive polarity supply line 96 and the lower ends of the lower windings of relays U and V. A diode 98 is connected between contacts U1 and contacts V1. Likewise a diode 100 is connected between contacts U3 and contacts V1.

Contacts U4 and diode 86 are connected in a line between line 66 and a junction 102. Contacts U2 and diode 88 are connected in a line between the line 68 and the junction 102.

In logic module K2, relay W is provided with normally closed contacts W1 and normally open contacts W2, and relay X is provided with normally open contacts X1 and X2. Contacts W1 are connected in a circuit between junction 102 and the upper winding of relay W, while contacts W2 are in a circuit between junction 102 and the upper winding of relay X. Contacts X1 are connected between the positive line 96 and the lower ends of the lower windings of relays W and X. A diode 104 is connected between contacts W1 and X1, and a diode 106 is connected between contacts W2 and X1. Junctions between the windings of each relay are connected to the line G.

Contacts V2 are connected in circuit with the winding of relay Z between the line G and line 96 to pick up relay Z when contacts V2 are closed. Contacts X2 and winding Y are in a circuit between lines 96 and G to pick up relay Y when contacts X2 are closed. Although other suitable types may be employed, relays U, V, W and X may be reed relays.

In converter 64, positive pulses coming in on line 68 when contacts L1 are closed are blocked from line 66 by diode 82. Likewise positive pulses coming in on line 66 when contacts R1 are closed are blocked from line 68 by diode 84. Diodes 86 and 88 perform similar functions. When the error detection circuitry 38 causes either relay R or L to pick up, the output of oscillator 56 is fed into logic modules K1 and K2 through contacts R1 or L1 depending on the desired direction of movement of the reference potentiometer 14.

Assume that the relay logic modules K1 and K2 and relays Y and Z are in the state shown, and that it is desired to raise the speed of motor 18 from a low speed to a predetermined higher speed. The contact arm of potentiometer 48 is moved, for example manually, clockwise to a predetermined position which by previous calibration is identified with the desired or command speed of motor 18. This results in a net positive signal to amplifier 42, and by inversion a negative signal on line 44, thus to pick up relay R and close contacts R1 to connect line 60 to line 66. Pulses from the oscillator 56 along line 60 are then fed into the logic modules K1 and K2 in the following manner.

The first pulse on the line 66 passes through closed contacts U1 energizing both of the windings of relay U but only the lower winding of relay V because of blocking action of the diode 100. No change occurs in the contacts of relay U but contacts V1 and V2 close. Closure of contacts V2 causes motor terminals A and C to be energized, thus providing the input pattern $A \cdot \overline{B} \cdot C \cdot \overline{D}$, and moving the motor output one step clockwise. When the input pulse disappears, latch supply from line 96 through contacts V1 energizes only one winding of relay U and only one winding of relay V, diodes 98 and 100 blocking the other windings. All contacts of relay U change position while contacts V1 and V2 remain closed, and relay Z remains picked up continuing the energization of motor terminals A and C (pattern $A \cdot \overline{B} \cdot C \cdot \overline{D}$). With both relays U and V held ON (picked up) by the latch current through contacts V1, logic module K1 may be said to be "latched up."

The second pulse from line 66 passes through contacts U3 energizing only the already energized winding of relay U and at the same time energizing both windings of relay V. The contacts of relay U remain unchanged, but contacts V1 and V2 are opened and relay Z is released. In the meantime, the same pulse that entered through contacts U3 also entered through contacts U4, diode 86 and contacts W1 to energize both windings of relay W and only one winding of relay X. Contacts of relay W remain unchanged, contacts X1 and and X2 close, and relay Y is picked up to provide the signal pattern $\overline{A} \cdot B \cdot C \cdot \overline{D}$ and energize motor terminals B and C advancing the motor shaft another step clockwise. When the second pulse disappears, logic module K1 returns to the original state, while logic module K2 is latched up.

In response to the third pulse, logic module K1 is again latched up, while logic module K2 remains latched. This picks up both relays V and X, and thereby relays Y and Z to produce and apply to the input of motor 34 the signal pattern $\overline{A} \cdot B \cdot \overline{C} \cdot D$ thus to energize terminals B and D and move the motor output another step clockwise.

On arrival of the fourth pulse, both modules K1 and K2 will be unlatched (returned to their original state). This releases relays V, X, Y and Z to produce the signal pattern $A \cdot \bar{B} \cdot \bar{C} \cdot D$, which energizes terminals A and D and advances the motor another step clockwise.

The fifth pulse starts the sequence again, and each of the incoming pulses continues to step the motor clockwise until the value of the negative signal on line 44 falls to such an extent that the voltage across relay coil RW drops below the "drop out" value of relay R. This occurs when the actual position of motor output 36 arrives at or near the commanded or desired position. When relay R releases, contacts R1 open to block the flow of pulses to the converter 64.

In case it is desired to lower the speed of motor 18, potentiometer 48 is moved counterclockwise producing a positive signal on line 44 indicating clockwise error requiring counterclockwise correction to reduce the error. This turns ON transistor T1 and picks up relay L to close contacts L1, thus to connect line 60 with line 68, thereby to steer the input pulses into line 68. This again results in relay Z alternating between states (ON–OFF–ON–OFF, etc.) with every pulse, and relay X alternating between ON and OFF states on every other (every second) pulse. However, this time relay X changes state on the odd numbered pulses. As a result, the above sequence of signal patterns is reversed to step motor 34 in the opposite (counterclockwise) direction. The sequence of motor input signal patterns provided on lines AL, BL, CL and DL will be $\bar{A} \cdot B \cdot \bar{C} \cdot D$; $\bar{A} \cdot B \cdot C \cdot \bar{D}$; $A \cdot \bar{B} \cdot C \cdot \bar{D}$; $A \cdot \bar{B} \cdot \bar{C} \cdot D$; $\bar{A} \cdot B \cdot \bar{C} \cdot D$, etc.

The pick up voltages of relays R and L are adjusted so that as the motor 34 approaches the balance point, there is no overshoot. This is done by adjusting variable resistors 72 and 74 to set the pick up voltages (across relay coil and series resistor) of the respective relays so that neither relay R nor relay L is picked up as long as motor 34 is within its closest step of being balanced.

A particular example of motor 34 (as described in U.S. Pat. 3,117,268) in the particular system disclosed herein is stepped $\frac{1}{200}$ of a revolution by each incoming pulse on line 60. Assuming a 10-turn reference potentiometer, the revolution of the system is one part in 2,000. The rate of change of position or reference of this system may be varied by varying the frequency of oscillator 56 to vary the repetition rate of the pulses on line 60. In a particular operating example, the rate of change of the reference potentiometer 14 was variable from one pulse in 10 seconds to 5 pulses in one second. For other systems, the rate of change is limited only by the output frequency of the oscillator.

Some stepping motors (for example the type described in U.S. Pat. 3,117,268) operate as synchronous motors when AC is supplied in split phase to two windings. Thus, if a fast return to the zero position of potentiometer 14 is desired, AC voltage can be applied to the motor 34. One example of such motor operates at 72 r.p.m. with 60-cycle AC input.

Although the ratio of pulse translation to steps is one-to-one in the disclosed embodiment, this is by way of example only as stepping motors and associated translating apparatus employing other ratios of pulses-to-steps may be constructed and employed in practicing the invention.

From the disclosure herein, it is apparent that the present invention provides a unique remote position control and reference setting system providing constant or controllable rate of change.

It should be apparent that although the disclosed example involves rotary motors and potentiometers, the system is equally applicable to different styles of movement, for example, rectilinear motors and rectilinearly movable potentiometers.

It is to be understood, that the herein described arrangements are simply illustrative of the principles of the invention, and that other embodiments and applications are within the spirit and scope of the invention.

What is claimed is:
1. Control apparatus comprising:
   (A) a position control closed loop system comprising a stepping motor having an electric input circuit and mechanical output means selectively driven in discrete steps in one or the opposite direction in response respectively to one or the other of two different input signal arrangements applied to said input circuit, and control means responsive to difference between actual and desired positions of said mechanical output means for applying to said motor input circuit one or the other of said signal arrangements depending on the direction of error between said actual and desired positions;
   (B) a condition regulating second closed loop system having an error generator that provides a condition correcting signal in response to difference between a feedback signal representing actual condition and a reference signal representing desired condition; and
   (C) adjustable reference means responsive to said mechanical output means for supplying to said error generator a reference signal representing said desired condition and whose value is dependent on the position of said mechanical output means.

2. A position control closed loop system comprising a stepping motor having an electric input circuit and mechanical output means selectively driven in discrete steps in one or the opposite direction in response respectively to one or the other of two different input signal arrangements applied to said input circuit, means for providing a reference signal representing desired position of said mechanical output means, means responsive to said mechanical output means for providing a feedback signal representing actual position of said mechanical output means, and control means responsive to said reference and feedback signals when there is a difference between actual and desired positions of said mechanical output means for applying to said motor input circuit one or the other of said signal arrangements depending on the direction of error between said actual and desired positions, said control means comprising second control means and means for supplying periodic pulses to said second control means, said second control means being connected to said motor input circuit, said second control means being operable in response to error between said actual and desired positions to translate said periodic pulses to one or the other of said signal arrangements depending on the direction of error between said actual and desired positions, said translation occurring at a fixed ratio of said pulses to said discrete steps.

3. The combination as in claim 1 wherein said control means comprises a pulse generator and second control means, said pulse generator having an output circuit providing periodic pulses, said second control means being connected between said output circuit and said motor input circuit, said second control means being operable in response to error between said actual and desired positions to translate said periodic pulses to one or the other of said signal arrangements depending on the direction of error between said actual and desired positions, said translation occurring at a fixed ratio of said pulses to said discrete steps.

4. The combination as in claim 2 which further includes means for varying the periodicity of said pulses whereby the rate of stepping said mechanical output means may be varied.

5. A position control closed loop system comprising a stepping motor having an electric input circuit and mechanical output means selectively driven in discrete steps in one or the opposite direction in response respectively to one or the other of two different input signal arrangements applied to said input circuit, and control means responsive to difference between actual and desired positions of said mechanical output means for applying to said motor input circuit one or the other of said signal arrangements depending on the direction of error between said actual and desired positions, said control means comprising second control means and pulse generating means for supplying periodic pulses to said second control means, said second control means being connected to said motor input circuit, said second control means being operable in response to error between said actual and desired positions to translate said periodic pulses to one or the other of said signal arrangements depending on the direction of error between said actual and desired positions, said translation occurring at a fixed ratio of said pulses to said discrete steps, said second control means comprising a converting circuit having respective first and second input lines for converting pulses received on the first input line to one of said signal arrangements and pulses received on the second input line to the other of said signal arrangements, and means responsive to difference between said actual and desired positions for steering said pulses from said pulse generator to one or the other of said first and second input lines depending on the direction of error between said actual and desired positions.

6. The combination as in claim 3 which further includes means for varying the periodicity of said pulses whereby the rate of stepping said mechanical output means may be varied.

7. The combination as in claim 3 wherein said means for supplying periodic pulses comprises pulse generating means, and wherein said second control means comprises a converting circuit having respective first and second input lines for converting pulses received on the first input line to one of said signal arrangements and pulses received on the second input line to the other of said signal arrangements, and means responsive to difference between said actual and desired positions for steering said pulses from said pulse generator to one or the other of said first and second input lines depending on the direction of error between said actual and desired positions.

8. The combination of claim 5 wherein one of said signal arrangements is a succession in a particular sequence of a plurality of different signal patterns, the other signal arrangement is a succession in the reverse sequence of said plurality of different signal patterns, and the mechanical output means moves one step in response to each of said signal patterns.

9. The combination of claim 7 wherein one of said signal arrangements is a succession in a particular sequence of a plurality of different signal patterns, the other signal arrangement is a succession in the reverse sequence of said plurality of different signal patterns, and the mechanical output means moves one step in response to each of said signal patterns.

10. The combination as in claim 1 wherein said second closed loop system is a closed loop speed regulating system for regulating the speed of a second motor, and the terms "actual condition" and "desired condition" respectively refer to actual speed of the second motor and desired speed for that motor.

11. The combination as in claim 7 wherein said second closed loop system is a closed loop speed regulating system for regulating the speed of a second motor, and the terms "actual condition" and "desired condition" respectively refer to actual speed of the second motor and desired speed for that motor.

12. The combination as in claim 9 wherein said second closed loop system is a closed loop speed regulating system for regulating the speed of a second motor, and the terms "actual condition" and "desired condition" respectively refer to actual speed of the second motor and desired speed for that motor.

References Cited

UNITED STATES PATENTS

| | | |
|---|---|---|
| 2,922,940 | 1/1960 | Mergler. |
| 2,941,136 | 6/1960 | Marantette et al. |
| 3,024,399 | 3/1962 | Valentino _____ 318—283 |
| 3,246,218 | 4/1966 | Centner et al. _____ 318—28 XR |
| 3,359,474 | 12/1967 | Welch et al. _____ 318—138 |
| 3,372,322 | 3/1968 | Lockwood et al. ___ 318—18 XR |
| 3,414,785 | 12/1968 | Orahood et al. _____ 318—18 |

BENJAMIN DOBECK, Primary Examiner

U.S. Cl. X.R.

318—28